United States Patent
Shan et al.

(10) Patent No.: US 9,460,742 B1
(45) Date of Patent: Oct. 4, 2016

(54) SELECTING SERVO CONTROLLER BASED ON PREDICTED POSITION ERROR SIGNAL SPECTRUM

(71) Applicant: Seagate Technology LLC, Cupertino, CA (US)

(72) Inventors: XiMin Shan, Longmont, CO (US); Xinghui Huang, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/710,829

(22) Filed: May 13, 2015

(51) Int. Cl.
*G11B 21/02* (2006.01)
*G11B 5/596* (2006.01)

(52) U.S. Cl.
CPC .................... *G11B 5/59627* (2013.01)

(58) Field of Classification Search
None
See application file for complete search history.

(56) References Cited

U.S. PATENT DOCUMENTS

| | | | |
|---|---|---|---|
| 5,394,322 A | 2/1995 | Hansen | |
| 5,909,661 A | 6/1999 | Abramovitch et al. | |
| 6,204,988 B1 | 3/2001 | Codilian et al. | |
| 7,009,802 B1 * | 3/2006 | Ehrlich | G11B 5/59666 360/75 |
| 7,268,968 B2 | 9/2007 | Semba et al. | |
| 7,742,250 B2 * | 6/2010 | Nelson | G11B 5/6064 360/30 |
| 8,213,105 B2 | 7/2012 | Bui et al. | |

* cited by examiner

*Primary Examiner* — K. Wong
*Assistant Examiner* — Kin Wong
(74) *Attorney, Agent, or Firm* — Hollingsworth Davis, LLC

(57) ABSTRACT

A discrete Fourier transform (DFT) of a position error signal (PES) of a read/write head controlled by a currently-used controller is determined. A plurality of predicted PES spectra are determined based on the DFT of the PES and a plurality of sensitivity functions associated with a plurality of controllers. One of the plurality of controllers is selected based on respective deviation metrics of the plurality of PES spectra. Servo control of the read/write head changes to use the selected controller.

20 Claims, 7 Drawing Sheets

SELECTING SERVO CONTROLLER BASED ON PREDICTED POSITION ERROR SIGNAL SPECTRUM

SUMMARY

Various embodiments described herein are generally directed to selecting control sensitivity based on predicted position error signal spectrum. In one embodiment, a discrete Fourier transform (DFT) of a position error signal (PES) of a read/write head controlled by a currently-used controller is determined. A plurality of predicted PES spectra are determined based on the DFT of the PES and a plurality of sensitivity functions associated with a plurality of controllers. One of the plurality of controllers is selected based on respective deviation metrics of the plurality of PES spectra. Servo control of the read/write head changes to use the selected controller.

In another embodiment, a background process between transition events involves: calculating a discrete Fourier transform (DFT) of a position error signal (PES) of a read/write head; determining a plurality of PES predictions by scaling the DFT by a plurality of sensitivity functions associated with respective ones of a plurality of controllers; and selecting one of the plurality of PES predictions based on respective deviation metrics of the plurality of disturbance estimations. During the transition events, a selected controller associated with the selected PES prediction is utilized for servo control of the read/write head based on the deviation metric of the selected controller satisfying a threshold.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Some hard drives, such as hard drives used in portable devices, are designed with the assumption that significant mechanical disturbance (e.g., shock, vibration) of the drive may occur while the hard drive is operating. As such, the hard drives may include measures to compensate for shock and vibration during operation. However, even in a fixed installation (e.g., desktop, server), shock and vibration may be present. For example, in a multi-drive configuration such as a disk array, the cooling fans as well as the drives themselves may generate vibrations that may be transmitted between hard drives through the structure in which they are mounted. This vibration can affect, among other things, tracking of the read/write head over the recording media. In other installations (e.g., a tablet or laptop computer), vibration generating components such as speakers, force-feedback devices, etc., may cause similar disturbances that affect a hard drive.

The present disclosure relates generally to methods and apparatuses that compensate for disturbances affecting a hard drive servo system. Generally, the servo system includes actuators and control circuitry that position a read/write head over tracks of a hard disk recording medium. One technique for dealing with disturbance is known as feed-forward compensation. A feed-forward compensator generally operates by measuring vibration (e.g., via an accelerometer or piezoelectric sensor) and using the measurement to form a compensation signal. The compensation signal is combined with an actuator control signal to mitigate the effects of the disturbance.

While feed-forward compensation can be effective, it is not without its drawbacks. For example, the sensors may be susceptible to noise, which can cause erroneous compensation signals to be sent to the actuator. The actuator that moves the read/write head may be frequency limited, e.g., unable to reject measured disturbances above a certain frequency range. In some cases, due to the sensor placement of complexity of the structures, there may be only partial correlation between what the sensors detect and what is being experienced at the read/write head.

Other techniques for dealing with disturbance rejection involve analyzing the position-error signals generated by the read/write head (e.g., by traversing servo marks on the recording medium that generate positioning signals) and try to estimate disturbance based on these signals. For example, by looking at a spectrum of the position error signal, some types of disturbances can be identified and compensated for. However, such analysis may be processor intensive, and therefore difficult to implement in a real-time control loop.

Figure 1:
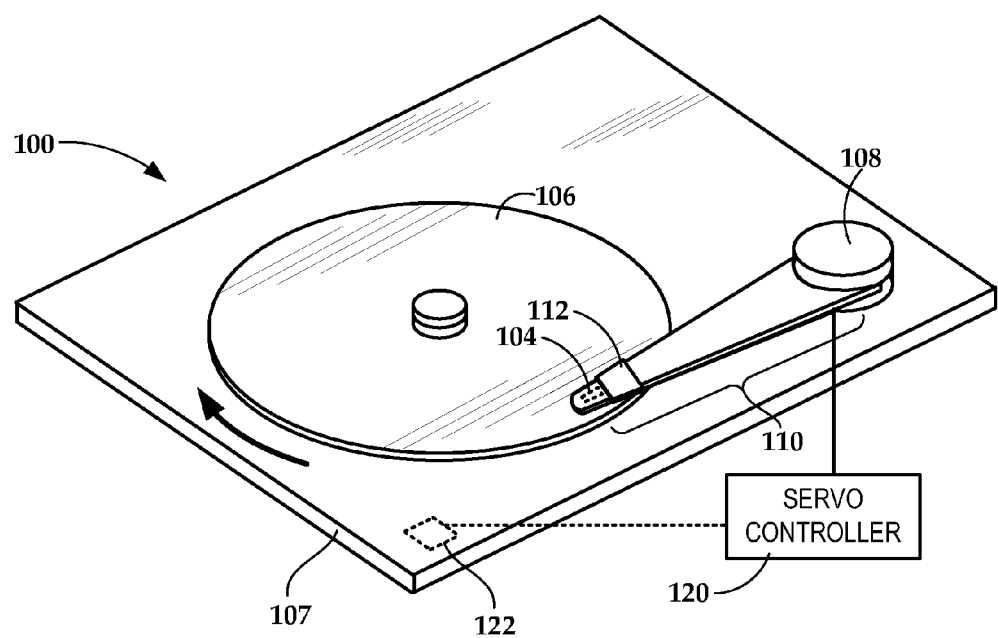
FIG. 1 is a perspective view of an apparatus according to an example embodiment.

The present disclosure describes techniques for estimation of disturbance and position error signal for servo control optimization. The techniques may be used on devices without vibration sensors, may be used in a device where vibration sensors are included but not activated in some modes, and/or used to augment feed-forward servo controllers that use vibration sensors. The proposed architectures are described in the context of hard drive servo control systems, although may be applicable to other control systems. In FIG. 1, a perspective view that illustrates components of a hard drive apparatus 100 according to an example embodiment.

The apparatus 100 utilizes an actuating system to position a slider 104 over a spinning magnetic media 106 (e.g., a hard disk). An electric motor (not shown) mounted on a basedeck 107 drives the media 106 to achieve the desired media velocity. The slider 104 includes a read/write head that records to and reads from the media 106. The illustrated actuating system is a dual-stage configuration, which includes a voice coil motor (VCM) 108 that drives an arm 110 with the slider 104 mounted at the end. The dual-stage actuating system also includes a microactuator 112 mounted in the arm 110 for fine tracking control of the slider 104. The microactuator 112 may be referred to herein as a "PZT" in reference to a piezoelectric material used in some microactuators. However, such reference is not meant to limit the disclosure to PZT microactuators. Further, the embodiments described herein need not be limited to dual-stage actuation systems, and may be used with servo systems having more or fewer actuation stages, or any trajectory tracking system that minimizes steady-state tracking error.

While only one arm 110 and slider 104 is shown, the apparatus 100 may include multiple such arms, one for each surface of each disk 106 employed in the apparatus 100. Each arm may contain a microactuator for individual fine tracking control, although all arms may be commonly driven by the VCM 108. A servo controller 120 is capable of being electrically coupled to the microactuator 112 and VCM 108 to apply control signal. The servo controller 120 may also be coupled to read data back from the microactuator 112, VCM 108, and/or slider 104, e.g., position signals, sensor data. The servo controller 120 includes at least one of a processor, memory, and specialized logic and analog circuitry (e.g., digital signal processing circuitry). Some operations of the servo controller 120 may be implemented in software and/or firmware.

The illustrated microactuator 112 is shown located within a suspension of the arm 110. In other configurations, the microactuator 112 may be positioned elsewhere, such as between the end of the arm 110 and the slider 104. Generally, the microactuator 112 may be located anywhere in the apparatus 100 where it can assist a primary control component such as the VCM 108. The functions of the microactuator 112 may include fine/fast tracking and seeking control, reduction of run-out and other functions that generally improve drive performance. While the illustrated dual-stage actuating system is shown as driving a pivoting arm 110, concepts described below may be applicable to other types of drive systems, e.g., linear tracking arms.

One or more vibration sensors 122 may optionally be located on the basedeck 107 and/or on any other structure or component. The vibration sensor 122 measures rotational and/or linear vibration, and can be used by the servo controller 120 for feed-forward compensation. The servo implementations described below do not require feed-forward compensation, but may be used to augment a feed-forward configuration.

Figure 2:
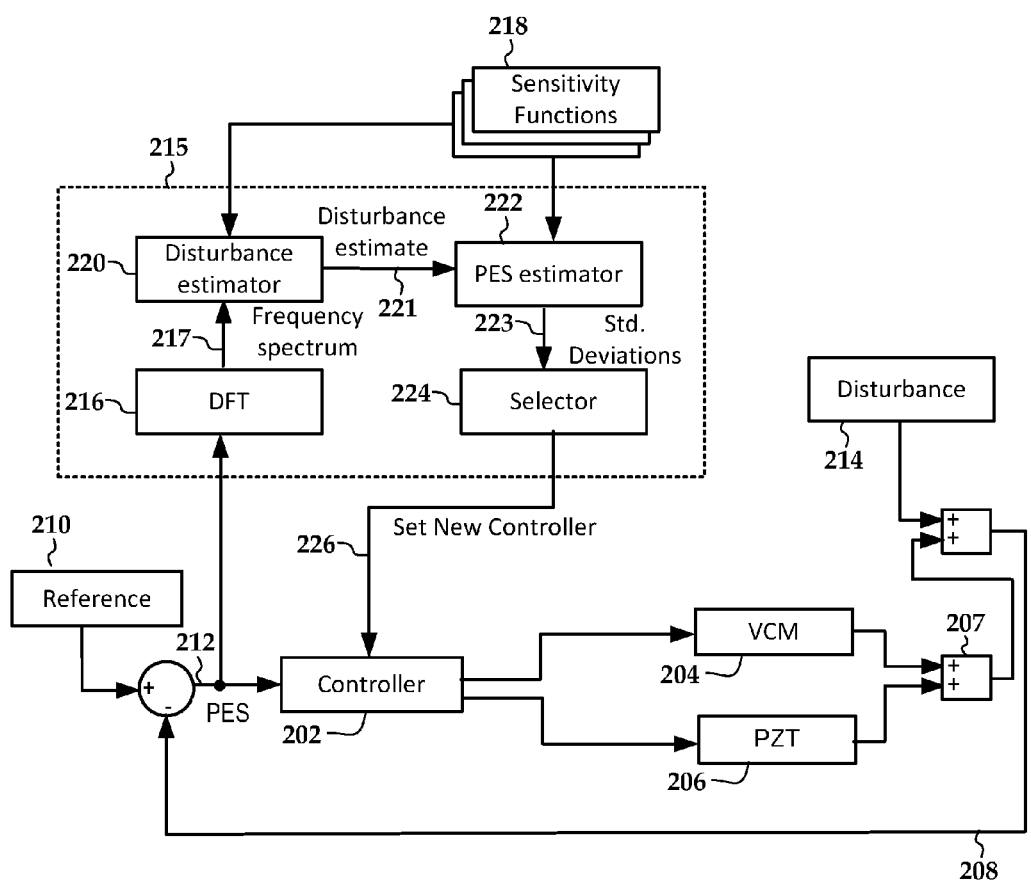
FIG. 2 is a block diagram of a servo control system according to an example embodiment.

In reference now to FIG. 2, a control diagram illustrates a servo control system according to an example embodiment. Generally, a controller 202 provides signals to drive a VCM 204 and microactuator 206 that position a read/write head. The VCM 204 and microactuator 206 together change a position of the read/write head, as indicated by block 207. A reference input 210 is a command that drives the read/write head to a particular position. The actual position 208 is the dual-stage servo response to the reference input 210 plus disturbance 214. The disturbance 214 is modeled as a lumped disturbance at the position node. The difference between the reference position 210 and actual position 208 is defined as position error signal (PES) 212. The PES 212 is fed back to the controller 202, and the system attempts to maintain a zero value of PES 202 during steady-state operations, e.g., tracking of the read/write head. Generally, the PES 212 is provided from a read element of the read/write head, e.g., via read channel circuitry that may include a preamplifier, filter, digital-to-analog converter, etc.

The controller 202 determines what control signals to apply to the VCM 206 and microactuator 206 to maintain a particular displacement of the read/write head as commanded by the reference position 210. The frequencies of these control signals may vary depending on which device is being controlled. For example, the microactuator 206 generally operates at higher frequencies and causes smaller displacements than the VCM 204. As such, the VCM 204 may be used primarily for larger displacements such as changing tracks, whereas the microactuator 206 may be used for fine adjustment during tracking. The characteristics of the disturbance 214 and the actuators may dictate the levels (e.g., gain applied by the controller) of the control signals at particular frequencies. For example, it may be desirable to attenuate control signals around some disturb frequencies to prevent instability. It may also be desirable to attenuate the control signals near natural frequencies of the actuators and/or mechanical components.

The characteristics of the disturbance 214 can change significantly over time due to change in operating environment (e.g., operation of nearby devices, changes in ambient temperature). As previously noted, one way of dealing with dynamic disturbance is through feed-forward compensation. Other techniques for compensating for dynamic disturbance involve estimating the disturbance based on the PES as well as plant models of the VCM 204 and the microactuator 206. While disturbance estimation can be effective, it requires significant processing resources.

In the illustrated example, the controller 202 is configured to achieve one of a set of predetermined sensitivity functions 218 when setting gain and other parameters for controlling the VCM 204 and microactuator 206. These sensitivity functions 218 include different frequency responses that are configured to minimize the effects of certain types of disturbances. In order to select an optimum sensitivity (e.g., one which minimizes steady-state position errors), a background process 215 performs operations at periodic intervals and changes the controller 202 as needed to achieve the desired sensitivity function.

As indicated by the discrete Fourier transform (DFT) block, a DFT is performed on a set of samples of the PES 212. Generally, the DFT converts the samples from the time domain to the frequency domain, and may use any known DFT algorithms, e.g., fast Fourier transform (FFT), Goertzel DFT, recursive FFT, etc. A particular number of PES samples may be used, and the resulting frequency spectrum 217 can be used to estimate the disturbance via disturbance estimator 220. The disturbance estimator 220 can determine the disturbance estimate 221 by dividing the DFT of the PES by the sensitivity of the currently-used controller 202, e.g., est(Disturb)=DFT(PES)/current sensitivity.

The estimated disturbance 221 is provided to a PES estimator 222, which determines a plurality of PES predictions by applying the current disturbance estimate to the plurality of control loop sensitivity functions 218. For example, the frequency spectrum of predicted PES for each candidate sensitivity function can be obtained using the relation DFT(PES_predicted)=est(Disturb)*Candidate_sensitivity. The frequency spectrum of each predicted PES can then be reduced by the PES estimator 222 to a scalar metric that facilitates comparison to choose an optimum (e.g., minimum) PES. The previously obtained frequency spectrum 217 of the PES can also be reduced to a similar metric by the PES estimator 222.

In one example, the PES estimator finds a standard deviation ($\sigma$) for each of the estimated PES spectra. For purposes of this disclosure, the term "standard deviation" may include any deviation metric, including those that do not require processor intensive operations (e.g., a square root) used to calculate the standard deviation $\sigma$. These deviation metrics include the standard deviation squared ($\sigma^2$), also referred to as the mean-sum-square. The PES estimator 222 provides these standard deviation metrics 223 to a selector 224. The selector 224 compares the standard deviation metrics 223 to each other and to an existing measure of PES If selector 224 determines that the lowest standard deviation of one of the PES spectra of other sensitivity functions 218 is lower than a standard deviation of the currently-used sensitivity function's PES, the associated sensitivity function may provide an improvement in performance. Generally, a low standard deviation indicates low PES magnitude and high disturbance rejection. In one configuration, the difference between the lowest standard deviation and the currently-used standard deviation may exceed a threshold before a controller associated with the lowest standard deviation is selected. This will reduce the amount of controller switching. If the lower standard of deviation will lead to an improvement, the selector 224 may instruct the control system to set a new controller, as indicated by signal 226. In response, the current controller is changed to the controller that achieves the selected sensitivity function for servo control of the read/write head via the controller 202. This change may occur at a convenient time when tracking is not occurring, e.g., during a seek.

Figure 3:
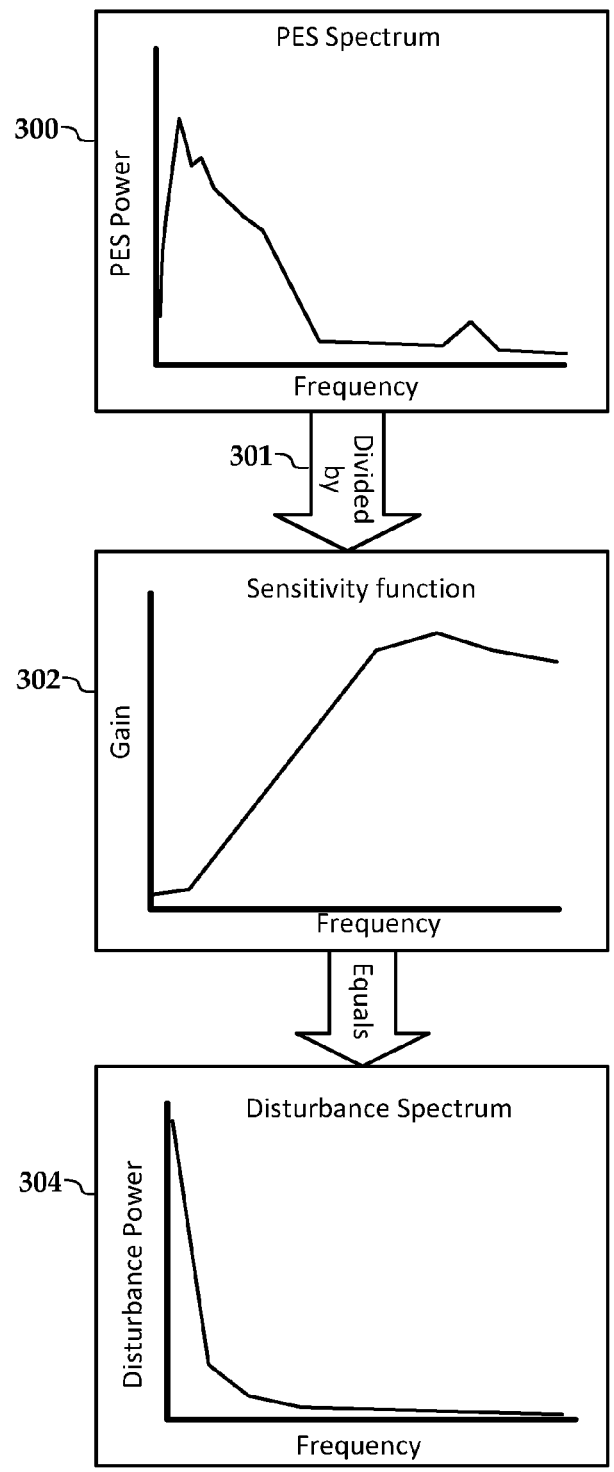
FIG. 3 is a block diagram illustrating the estimation of disturbance spectrum according to example embodiments.

In FIG. 3, a block diagram illustrates the derivation of estimated disturbance spectrum according to an example embodiment. During operation of the drive, a power spectrum 300 of PES may be obtained by taking samples of PES and performing a Fourier transform on the data. The PES spectrum 300 is divided by a known sensitivity function 302 of the current servo controller. This may generally involve dividing 301 a power value at each frequency of the PES spectrum 300 by a gain of the sensitivity function 302 at the same frequency. Particular values of the spectrum 300 and/or function 302 may be interpolated or otherwise estimated if the data sets (e.g., vectors) used to represent the functions are at different frequency resolutions or are in different forms.

The result of the division is an estimate of the spectrum 304 of the current disturbance affecting the storage device. This disturbance is modeled as a lumped value, e.g., as if it was measured directly to the read/write head and affecting both the microactuator and VCM. While the disturbance spectrum 304 is shown as being calculated directly, it is not strictly necessary for use in servo control. As will be described in more detail below, the estimate of disturbance spectrum 304 is an intermediate value used for PES prediction. However, other processes (e.g., adaptive filters) may have use for the estimate of disturbance spectrum 304, and so it may be calculated and stored in memory as needed.

Figure 4:
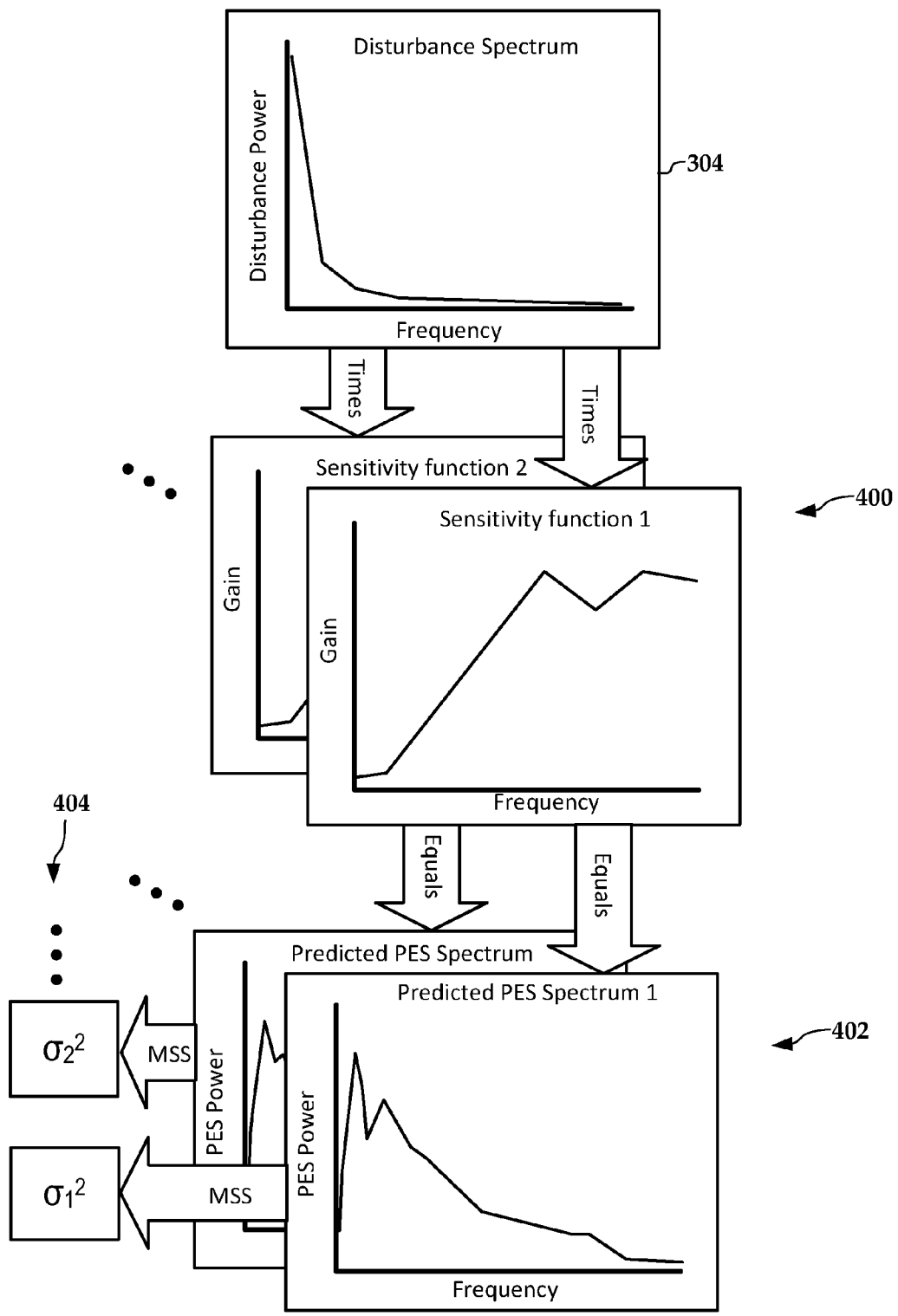
FIG. 4 is a block diagram illustrating the estimation of position-error for a plurality of sensitivity functions according to an example embodiment.

In FIG. 4, a block diagram illustrates how the estimated disturbance spectrum 304 from FIG. 3 is used to select candidate controllers based on their sensitivity functions. The estimated disturbance spectrum 304 is multiplied by each of two or more sensitivity functions 400. These sensitivity functions 400 may be known a priori, and may be hard-coded into the servo firmware and/or be determined in a drive self-test procedure. In the latter case, the self-test may be performed in the factory or in the field. Generally, the different sensitivity functions include different frequency responses that modify how the servo controller responds to a feedback signal, e.g., reduces control effort at some frequencies, increases control effort at other frequencies.

The result of multiplying the estimated disturbance spectrum 304 by the sensitivity functions 400 is two or more predicted PES spectra 402. It should be noted that the estimated disturbance spectrum 304 is an intermediate value, and need not be expressly calculated order to calculate the predicted PES spectra 402. The predicted PES spectra 402 can be calculated based only on the PES spectrum 300 of the current sensitivity, the current sensitivity function 302, and the other controller sensitivity functions 400, e.g., DFT(PES_predicted)=DFT(PES)/Current sensitivity*Candidate_sensitivity. Generally, this division by the current sensitivity function and multiplication by the candidate sensitivity function can be considered a form of scaling, where each component of the DFT at frequency f is scaled by $s^f_{new}/s^f_{old}$, where $s^f_{new}$ and $s^f_{old}$ are the gains of sensitivities at frequency f for the respective candidate and current control functions.

The predicted PES spectra 402 provide an estimate of the PES if the respective controller sensitivity functions 400 were used in lieu of the current sensitivity function. The spectra 402 will generally be discrete representations of a continuous function in the frequency domain. There may be a number of ways to choose which spectra 402 would provide the best performance, e.g., overall power, performance in some defined frequency band, etc. In this example, a scalar value that is indicative of standard deviation is calculated. Scalar values can be conveniently compared and require minimal amounts of memory for storage. In particular, mean-sum-square (MSS) values 404 are obtained, and can be used to select a new sensitivity function if it indicates an improvement over the currently used function.

In order to reduce the effects of spurious (e.g., short-lived) disturbance, the mean-sum-square values 404 may be time-averaged to smooth out the effects of these transient disturbances. For example, the past values of the mean-sum-square may be averaged into a moving average $\sigma^2_{avg}$, and the current mean-sum-square value is $\sigma^2_{cur}$. The value of mean-sum square $\sigma^2$ that is compared with the others is a weighted average $\sigma^2 = n_1 * \sigma^2_{cur} + n_2 * \sigma^2_{avg}$, where $n_1 + n_2 = 1$. For example, $n_1 = 0.1$ and $n_2 = 0.9$ will place less emphasis on the current value of mean-sum-square compared to the historical average. The value of $\sigma^2$ then becomes $\sigma^2_{avg}$ for the next iteration.

Figure 5A:
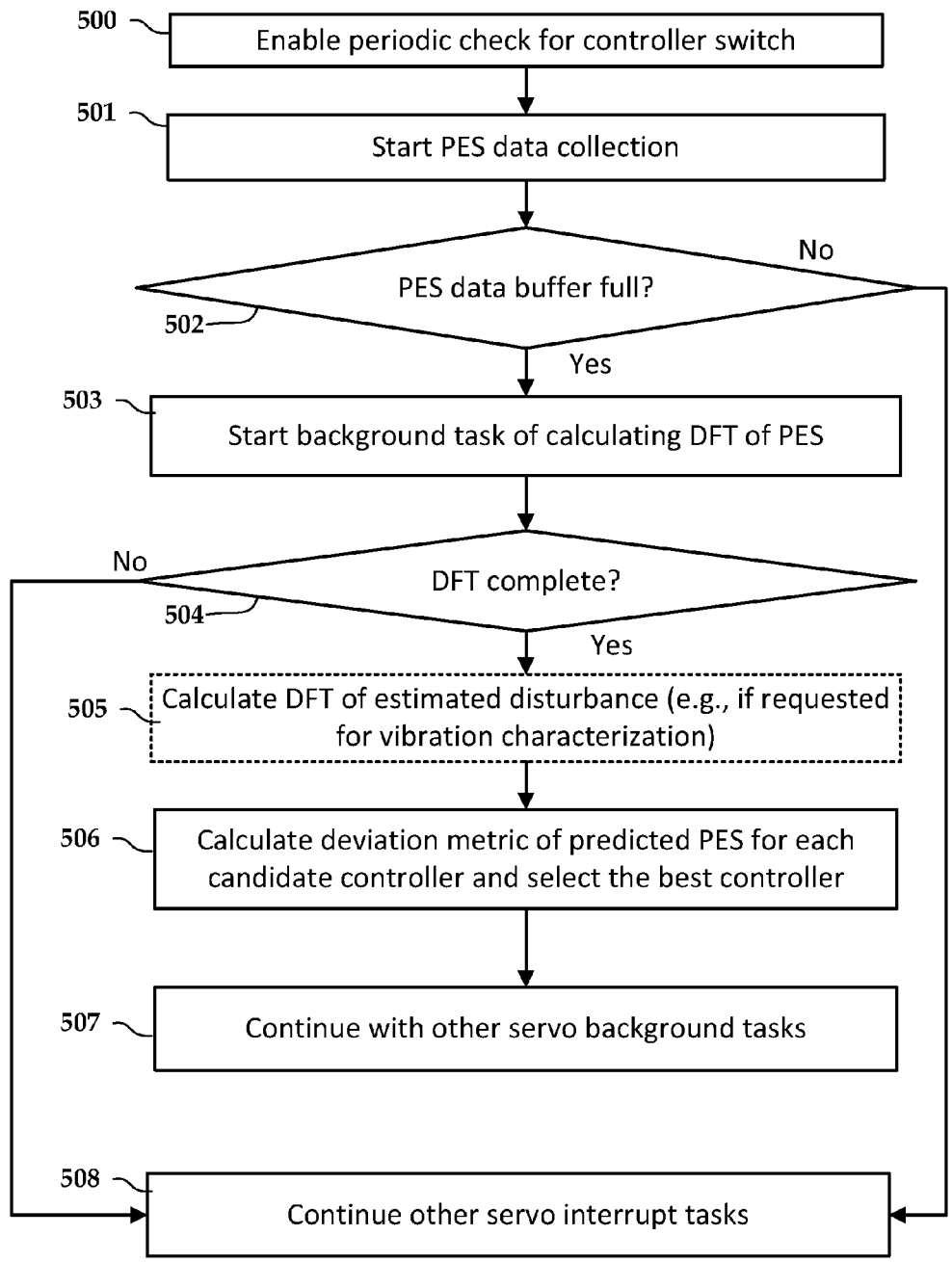
FIGS. 5A, 5B, and 6 are flowcharts showing methods according to example embodiments.
Figure 5B:
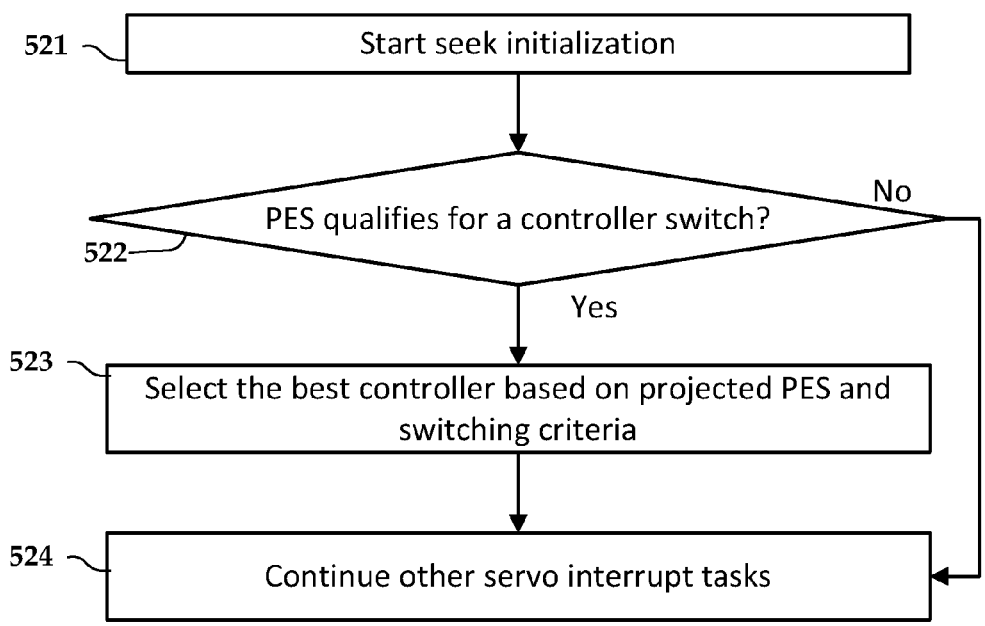

In FIGS. 5A and 5B, a flowchart illustrates a method according to an example embodiment. Generally, the method shown in FIG. 5A is a background process performed during track following, and the method shown in FIG. 5B is performed during a track seek or similar event when drive is not in a steady-state track following state. The method in FIG. 5A involves enabling 500 a periodic check for controller switch, e.g., the switching of a control sensitivity function. The check may be enabled 500, e.g., due to a setting or configuration. In response, PES samples are collected 501 as part of a background process. The PES data is placed in a buffer, and no further computation is done until the buffer is full, as indicated by block 502.

Once the PES data buffer is full, the DFT of the PES is calculated 503 as another background process, e.g., a separate thread of execution. In this case, the DFT can be implemented as a Cooley-Tukey FFT, which is an example of a recursive FFT. At block 504, the completion status of the DFT is tested. When the DFT is complete, the DFT of estimated disturbance can be optionally calculated 505, e.g., in cases where other processes can use a spectrum of the current vibration environment. At block 506, a predicted PES is calculated for all candidate controllers (e.g., as described in relation to FIGS. 3 and 4) and used to determine PES deviation metrics (e.g., mean-sum-square) for each candidate controller. Other servo background or interrupt tasks can be performed upon completion of various parts of the computations as indicated by blocks 507 and 508.

The method shown in FIG. 5A may be performed during a background process e.g., during track follow operation. The selected controller data found at block 506 is not used in the active servo control loop during track following, as an abrupt change in controller (or other factors) could lead to instability. Instead, the selection of a new controller is delayed until a seek (or other transition event) occurs, as indicated by the method in FIG. 5B. After seek initialization 521, the PES deviation metrics determined at block 506 in FIG. 5A are analyzed at block 522 in FIG. 5B to determine if a controller switch is warranted. If so, the best controller is selected 523 based on projected PES and switching criteria (e.g., if the moving average of the deviation metric of the selected controller is smaller than the deviation metric of the current controller by a threshold amount). After the controller switch 523, other servo interrupt tasks 524 can be performed.

Figure 6:
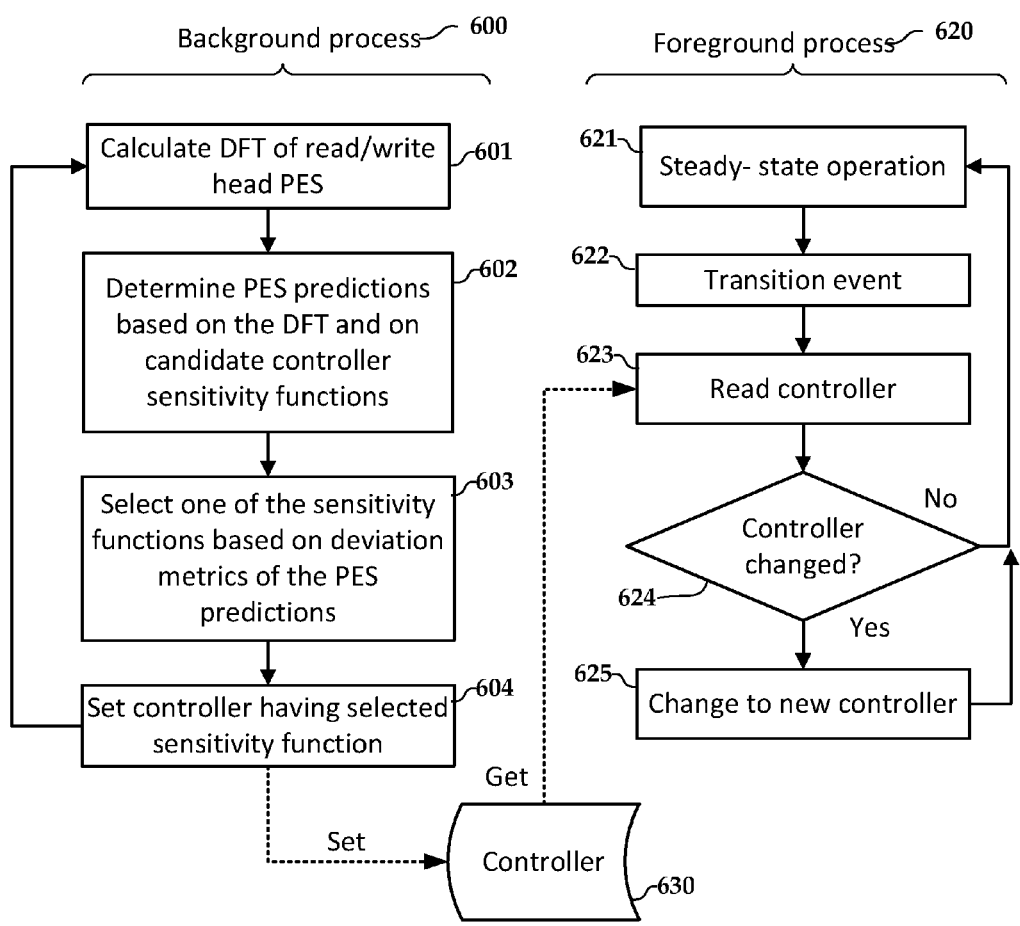

In FIG. 6, a flowchart shows a method according to another example embodiment. The method involves a background process 600 and a foreground process 620. Generally, these processes 600, 620 may be any sets of instructions that can operate in parallel, such as operating system processes, light-weight processes, threads, processes running on different controllers, etc. The foreground process 620 may have high priority, and be operate in a real-time or near-real-time environment. The background process 600 will generally have lower priority, and can be run in a batch processing mode, e.g., at such time as resources allow.

The background process 600 involves calculating 601 a DFT (e.g., recursive FFT) of a PES of a read/write head. A plurality of predicted PES spectra are then determined 602 based on the DFT of the PES and a plurality of controller sensitivity functions. Running averages of spectral metric, e.g., mean-sum-square of predicted PES, may also be calculated at block 602. One of the controllers is selected 603 based on respective deviation metrics of the plurality of PES spectra associated with the corresponding controllers. In this example, the selected controller is set 604 by writing to a commonly accessible memory location 630. Generally, setting 604 the controller may involve writing a reference to a set of controller parameters/instructions (not shown), which may also be stored in a commonly accessible memory area. Generally, the controller data may be read-only (e.g., set at the factory or during maintenance or repair operations) while the reference 630 to the controller may be written or read.

In the foreground process 620, a steady-state control operation 621 may involve executing a series of real-time control operations, such as setting actuator currents based on PES during track following. The steady-state operation 621 is interrupted by a transition event 622, such as a track seek. During this event 622, there is sufficient time to read 623 the reference to the controller stored in the memory location 630, determine 624 whether the controller has been changed (e.g., is valid and different from the currently-used controller) and change 625 from the current controller to the selected controller for servo control of the read/write head. After changing 625 the controller, the steady-state operation 621 may proceed using the new controller.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    calculating a discrete Fourier transform (DFT) of a position error signal (PES) of a read/write head controlled by a currently-used controller;
    determining a plurality of predicted PES spectra based on the DFT of the PES and a plurality of sensitivity functions associated with a plurality of controllers; and
    selecting one of the plurality of controllers based on respective deviation metrics of the plurality of PES spectra; and
    changing from the currently-used controller to the selected controller for servo control of the read/write head.

2. The method of claim 1, further comprising, for each of the plurality of PES predictions, determining a moving average of the deviation metrics of the PES prediction, and wherein the selected controller is selected based on the moving average associated with the selected controller having a minimum value.

3. The method of claim 2, wherein the changing to the selected controller is based on the moving average of the deviation metric of the selected controller being greater than a corresponding deviation metric of the current controller by a threshold amount.

4. The method of claim 1, wherein the determining of the plurality of PES predictions comprises:
    determining a current disturbance estimate based on dividing the DFT of the PES by a sensitivity function of the currently-used controller;
    multiplying the current disturbance estimate by the plurality of control loop sensitivity functions to obtain the plurality of PES spectra.

5. The method of claim 1, wherein the calculating of the DFT of the PES, the determining of the PES spectra, and the selecting of the selected controller are performed as a background process, and wherein the background process operates during track following of the read/write head, and wherein the changing to the selected controller for servo control of the read/write head occurs during a seek initialization of the read/write head.

6. The method of claim 1, wherein the plurality of sensitivity functions each include different frequency responses that modify how the respective controllers respond to a feedback signal.

7. The method of claim 1, wherein the deviation metrics comprise mean-square-sums.

8. The method of claim 1, wherein the DFT comprises a recursive fast-Fourier transform.

9. An apparatus comprising:
read channel circuitry that receives a position error signal (PES) from a read/write head; and
a servo control system coupled to the read channel circuitry, the servo control system positioning the read/write head via a currently-used controller, the servo control system further configured to:
calculate a discrete Fourier transform (DFT) of the PES using the currently-used controller;
determine a plurality of predicted PES spectra based on the DFT of the PES and a plurality of sensitivity functions associated with a plurality of controllers; and
select one of the plurality of controllers based on respective deviation metrics of the plurality of PES spectra; and
change from the currently-used controller to the selected controller for servo control of the read/write head.

10. The apparatus of claim 9, wherein the servo control system is further configured, for each of the plurality of PES predictions, to determine a moving average of the deviation metrics of the PES prediction, and wherein the selected controller is selected based on the moving average associated with the selected controller having a minimum value.

11. The apparatus of claim 10, wherein the changing to the selected controller is based on the moving average of the deviation metric of the selected controller being greater than a corresponding deviation metric of the current controller by a threshold amount.

12. The apparatus of claim 9, wherein the determining of the plurality of PES predictions comprises:
determining a current disturbance estimate based on dividing the DFT of the PES by a sensitivity function of the currently-used controller;
multiplying the current disturbance estimate by the plurality of control loop sensitivity functions to obtain the plurality of PES spectra.

13. The apparatus of claim 9, wherein the calculating of the DFT of the PES, the determining of the PES spectra, and the selecting of the selected controller are performed as a background process.

14. The apparatus of claim 13, wherein the background process operates during track following of the read/write head, and wherein the changing to the selected controller for servo control of the read/write head occurs during a seek initialization of the read/write head.

15. The apparatus of claim 9, wherein the deviation metrics comprise mean-square-sums.

16. A method comprising:
in a background process between transition events:
calculating a discrete Fourier transform (DFT) of a position error signal (PES) of a read/write head;
determining a plurality of PES predictions by scaling the DFT by a plurality of sensitivity functions associated with respective ones of a plurality of controllers; and
selecting one of the plurality of PES predictions based on respective deviation metrics of the plurality of disturbance estimations; and
during the transition events, utilize a selected controller associated with the selected PES prediction for servo control of the read/write head based on the deviation metric of the selected controller satisfying a threshold.

17. The method of claim 16, wherein the background process comprises a track-follow of the read/write head, and wherein the transition events comprise track seeks of the read/write head.

18. The method of claim 16, further comprising for each of the plurality of PES predictions, determining a moving average of the deviation metrics of the PES prediction, and wherein the selected controller is selected based on the moving average associated with the selected controller having a minimum value.

19. The method of claim 16, wherein the determining of the plurality of PES predictions comprises:
determining a current disturbance estimate based dividing the DFT of the PES by a sensitivity function of the currently-used controller;
multiplying the current disturbance estimate by the plurality of control loop sensitivity functions to obtain the plurality of PES spectra.

20. The method of claim 16, wherein the deviation metrics comprise mean-square-sums.

* * * * *